F. RADEMACHER.
NUT GATHERER.
APPLICATION FILED OCT. 15, 1919.
1,378,275.
Patented May 17, 1921.
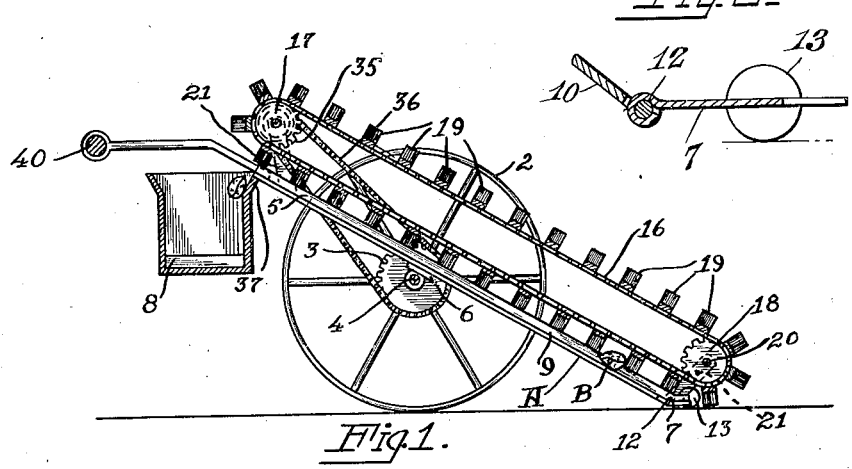
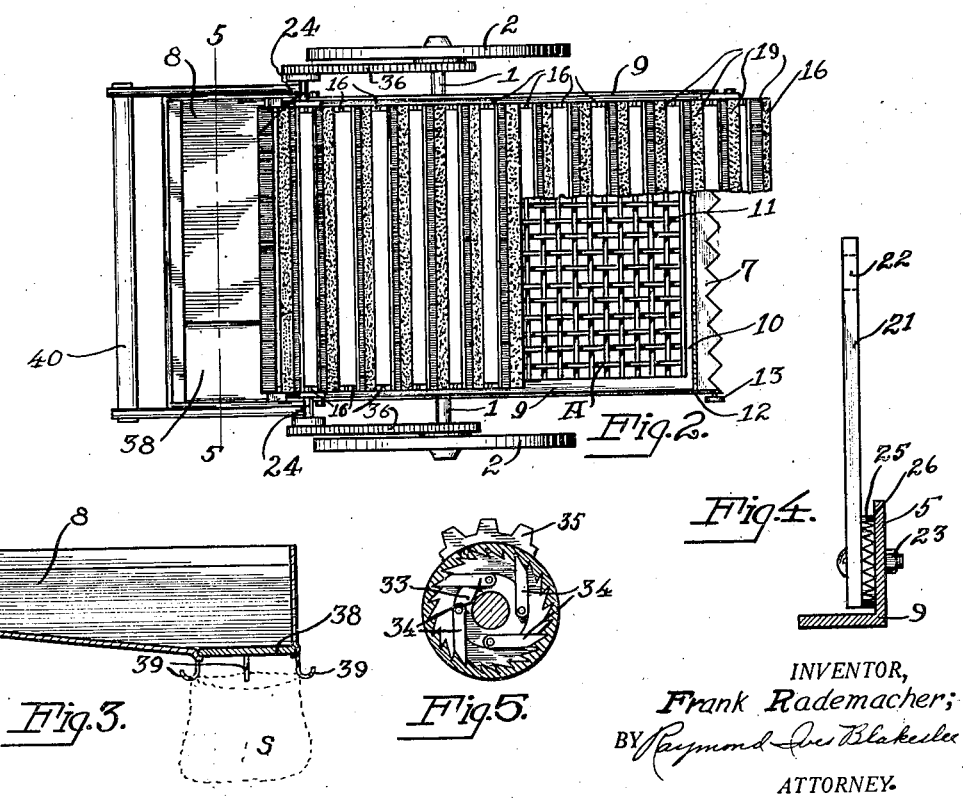
INVENTOR,
Frank Rademacher;
BY Raymond Des Blakeslee
ATTORNEY.

UNITED STATES PATENT OFFICE.

FRANK RADEMACHER, OF ONTARIO, CALIFORNIA.

NUT-GATHERER.

1,378,275.

Specification of Letters Patent.  Patented May 17, 1921.

Application filed October 15, 1919. Serial No. 330,698.

*To all whom it may concern:*

Be it known that I, FRANK RADEMACHER, a citizen of the United States, residing at Ontario, in the county of San Bernardino and State of California, have invented new and useful Improvements in Nut-Gatherers, of which the following is a specification.

The present invention relates to a machine for gathering nuts or small objects of a like nature from the ground or a floor surface and depositing them in a hopper from which they can be conveniently withdrawn or permitted to drop into a sack or other container, and has for its object to provide a device of this character which can be readily moved over the surface of the ground or floor and will operate in a most effective manner to pick up the nuts.

Further objects of the invention are to provide a nut harvesting machine of this character which is comparatively simple and inexpensive in its construction, which will accommodate itself to slight inequalities in the surface of the ground and enable all of the nuts to be picked up without difficulty, and which will gather the nuts in a quick and effective manner, thereby avoiding the expensive and laborious process of picking up the nuts from the ground by hand.

With these and other objects in view the invention consists in certain novel combinations, arrangements and associations of the parts, as will more fully appear as the description proceeds, the novel features thereof being pointed out in the appended claims.

For a full understanding of the invention reference is to be had to the following description and accompanying drawings in which:

Figure 1 is a longitudinal sectional view through a nut harvesting machine constructed in accordance with the invention;

Fig. 2 is a top plan view thereof with portions of the endless belt broken away;

Fig. 3 is a longitudinal sectional view through the discharge end of the hopper, showing the manner in which a sack can be supported to receive the nuts from the hopper when the slide at the bottom thereof is removed;

Fig. 4 is a detail view of the adjustable bearings for the rollers which support the endless belt;

Fig. 5 is a detail fragmentary view of the clutch connection between the driving mechanism and the upper roller of the endless belt, and, Fig. 6 is a detail view showing the pivotal connection between the pick up bar and the lower end of the inclined frame.

Corresponding and like parts are referred to in the following description and in all of the views of the drawings by like reference characters.

Referring to the drawing, which illustrates one possible embodiment of the invention, the numeral 1 designates an axle upon which the two main supporting wheels 2 are journaled, said wheels having sprockets 3 rigidly applied to the inner faces thereof. Bearings 4 are loose upon the opposite end portions of the axle 1 at points adjacent the wheels 2 and these bearings carry side plates 5 which are connected by a cross bar 6. The transverse middle portion of an inclined apron A rests upon this cross bar 6, the lower edge of the apron being provided with a toothed pick-up bar 7 which is adapted to travel over the surface of the ground or floor and assist the conveyer in engaging the nuts B and guiding them into position upon the apron to be carried upwardly thereon preparatory to being deposited in the hopper 8. The apron A is shown as including angle iron side pieces 9 which are connected at the lower ends by a cross bar 10, a sheet of foraminous material such as the woven wire 11 being secured to the frame and connecting the sides thereof. The toothed bar 7 is hingedly connected at 12 to the cross bar 10 and supported at its ends by small rollers 13 which are adapted to travel over the surface of the ground and maintain the toothed bar at all times in a close relation to the ground while it swings up and down as may be necessary to adjust itself to the surface of the ground.

Mounted over the apron A and in a parallel relation thereto is an endless conveyer belt 16 which passes around an upper roller 17 and lower roller 18. This endless belt may be of any suitable construction and carries a series of transversely extending sweeping elements such as the brushes 19.

The lower roller 18 and the upper roller 17 are supported by means of swinging arms 21 which extend upwardly from the ends of the apron A and at opposite sides thereof. These swinging arms 21 are each provided at their pivot end with a toothed portion 25 which co-engages a similar toothed portion 26 formed on the angle iron frame 9 as shown on the side plate 5 in Fig. 4. These toothed portions are so arranged that the swinging arms 21 may be moved either inwardly or outwardly by releasing the tension upon the bolts 23. The swinging arms 21 are each provided with slots 22 so that the rollers 18 and 17 may be journaled thereto.

It is obvious that by moving the swinging arms 21 holding the lower roller 18 the endless belt 16 will be raised and lowered from the ground and likewise by adjusting the swinging arms 21 holding the upper roller 17 the belt will likewise be raised or lowered. This therefore provides a positive arrangement whereby adjustment can be speedily made, corresponding to the size of the object to be picked up from the ground, whether it be walnuts or other objects, and allows an adjustment for the brushes 19 passing over the foraminous screen 10.

The trunnions 24 of the upper roller 17 are provided at their ends with disks 33 which have pawl and ratchet connections 34 with a sprocket wheel 35. These sprocket wheels 35 are connected by chains 36 to the sprocket wheels 3 of the main wheels 2 and the pawl and ratchet connections 34 are such that the disks 33 are locked with the sprocket wheels 35 when the device is moved forwardly, although they can turn independently of the disks when the direction of rotation of the sprockets is reversed. This provides the proper differential arrangement between the driving connections at opposite sides of the frame for enabling the device to be turned from side to side as may be necessary when it is in use.

As the device is advanced over the surface of the ground any nuts B in the path of the device will be engaged by the brushes 19 of the endless carrier and conveyed upwardly on the apron A. As indicated by Fig. 1, the transverse brush elements 19 of the endless conveyer may be properly spaced apart so that the nuts will be held between adjacent brush elements as they are carried upwardly on the apron. The operative portion of the apron is formed by the woven wire 11 which has a mesh of such a size that dirt or foreign matter which may have been gathered with the nuts will fall through openings as the nuts are being moved upwardly on the apron.

An inclined plane 37 extends downwardly from the upper end of the apron and leads to the hopper 8 within which the nuts are deposited. This hopper is in the form of an elongated and transversely disposed trough. The bottom of the hopper is inclined downwardly toward one end thereof where a discharge opening is provided, said discharge opening being normally closed by a slide 38. Hooks 39 may be arranged around the discharge opening for engaging some container such as a sack S and supporting the same in position to receive the nuts as they drop through the opening when the slide 38 is removed. Any suitable handle 40 may be applied to the frame 9 or other part of the machine for convenience in moving the machine over the surface of the ground.

The machine may be used for gathering small objects such as walnuts from the ground or a floor surface and will avoid the necessity of stooping over and picking up the nuts or other objects by hand. When so used in walnut groves the cost of harvesting the nuts will be materially reduced, since the nuts can be gathered more easily and more quickly than is possible by hand.

While I have illustrated and described one particular embodiment of my invention, it will be understood that I do not restrict myself to the exact details of construction shown, but that various modifications and changes can be made without departing from the spirit of the invention.

What I claim and desire to secure by Letters Patent is:

1. A machine for gathering nuts and like objects, including a wheeled support, an inclined apron mounted upon the wheeled support and formed with a foraminous sheet, an endless conveyer belt mounted parallel to the apron for coöperation therewith to engage the nuts and carry them upwardly on the apron, the foraminous sheet enabling foreign matter to be separated from the nuts as they are carried upwardly thereon, and a hopper receiving the nuts from the inclined apron.

2. A machine for gathering nuts and like objects, including a wheeled support, an inclined apron mounted thereon and provided with flanged side bars, an endless conveyer belt mounted parallel to the apron and provided with means for coöperation therewith to engage the nuts and carry them upwardly on the apron, arms pivotally connected to the flanged side bars of the apron, guide rollers supporting the conveyer belt and journaled in the side arms, and means for holding the arms in different angular positions to adjust the relation of the conveyer belt to the inclined apron.

In testimony whereof, I have signed my name to this specification in the presence of two subscribing witnesses.

FRANK RADEMACHER.

Witnesses:
H. J. STEINEMANN,
J. CALVIN BROWN.